Figure 1:
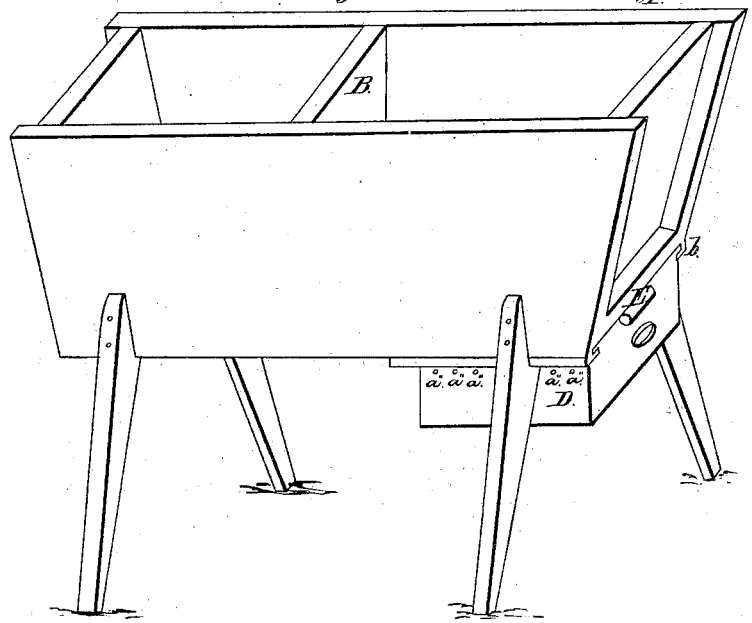

J. G. Denius,
Bread Machine.

Nº 63,617.     Patented Apr. 9, 1867.

Witnesses.
Irvin B. Wright.
Edward M. Wright.

Inventor.
Jos G. Denius by
Brown & Beadle Attys

United States Patent Office.

JOSEPH G. DENIUS, OF CAMDEN, OHIO.

Letters Patent No. 63,617, dated April 9, 1867.

---

IMPROVED DOUGH-TRAY.

---

The Schedule referred to in these Letters Patent and making part of the same.

---

TO ALL WHOM IT MAY CONCERN:

Be it known that I, JOSEPH G. DENIUS, of Camden, in the county of Preble, in the State of Ohio, have invented a new and useful Improvement in Dough-Trays; and I do hereby declare that the following is a full, clear, and exact description of the construction and operation of the same, reference being had to the accompanying drawings, making part of this specification, in which the same letters indicate the same parts. In the drawings—

Figure 2:
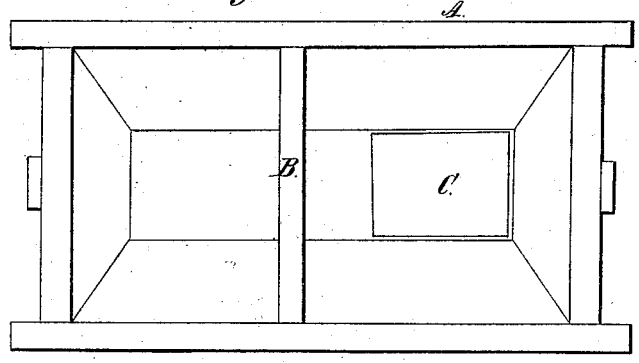
Figure 3:
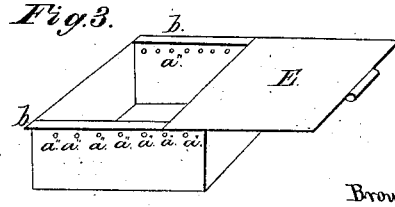

Figure 1 is a perspective view of my invention.
Figure 2, a top view of the tray itself; and
Figure 3 a perspective view of the fire-box.

This invention has for its object the supplying of heat to what is termed "sponge" in bread making, in order to induce fermentation. To this end the invention consists of a dough-tray with a bottom of sheet metal, in combination with a fire-box immediately beneath the sheet-metal bottom, as is hereinafter fully described.

To enable others skilled in the art to make and use my invention, I will proceed to describe its construction and operation.

A represents a dough-tray of any convenient size and shape. B represents a wooden partition placed crosswise of said tray for the separation of "sponge" from flour. This partition is made adjustable in the tray, so as to increase the size of either compartment at the expense of that of the other. C represents a piece of sheet metal inserted in and forming part of the bottom of the tray. D represents a fire-box made of any suitable material, in any desired shape, and of any required size. This fire-box is provided with flanges, $b$, at the upper edges of its two sides. Corresponding grooves are made in the bottom of the tray for the reception of these flanges, so that the fire-box may be slid under or out from under the sheet-metal part of the bottom at pleasure. The fire-box is designed to hold coals, hot ashes, etc., for the production of heat, which is conducted by the metallic bottom to the "sponge," to which, as is well known, heat is necessary in order to induce fermentation. E represents a cover to the fire-box, which, when closed, cuts off the supply of heat from the metallic bottom. An empty space is left for this purpose between the cover and the bottom. The heat thus prevented from passing into the tray escapes at the orifices $a$ in the upper part of the fire-box. It is obvious that the cover may be used to regulate the supply of heat to the tray, as well as cut it off entirely.

Having thus described my invention, what I claim as new, and desire to secure by Letters Patent, is—

The tray A, provided with a metallic bottom, in combination with the damper E and fire-box B, as and for the object explained.

JOSEPH G. DENIUS.

Witnesses:
ROBERT CONARROE,
JOHN GARDNER.